United States Patent [19]
Gallant et al.

[11] Patent Number: 5,081,638
[45] Date of Patent: Jan. 14, 1992

[54] EXCIMER LASER

[75] Inventors: Glen Gallant, Ottawa; Edward S. Williams, Nepean; Robert W. Weeks, Carp, all of Canada

[73] Assignee: Lumonics Inc., Kanata, Canada

[21] Appl. No.: 622,614

[22] Filed: Dec. 5, 1990

[51] Int. Cl.⁵ .................................................. H01S 3/97
[52] U.S. Cl. ........................................ 372/86; 372/57
[58] Field of Search ................................. 372/86, 57

[56] References Cited

U.S. PATENT DOCUMENTS

| | | | |
|---|---|---|---|
| 4,365,337 | 12/1982 | Cirkel et al. | 372/87 |
| 4,491,949 | 1/1985 | Beck et al. | 372/86 |
| 4,498,183 | 2/1985 | Levatter | 372/86 |

*Primary Examiner*—Leon Scott, Jr.

[57] ABSTRACT

An excimer laser has a pair of main electrodes defining a lasing space, and a series of pairs of pre-ionization pins arranged alongside the main electrodes. These pins form preionization gaps for generating discharges that provide ultraviolet radiation to condition the gas in the lasing space. The invention consists of providing a tracker of insulating material between each pair of pins to bridge the gap and provide a tracking surface for the pre-ionization discharge.

3 Claims, 2 Drawing Sheets

EXCIMER LASER

FIELD OF THE INVENTION

The invention relates to excimer lasers.

BACKGROUND OF THE INVENTION

A typical excimer laser employs a series of preionization gaps that are distributed along the sides of the main electrodes that define the lasing space and the optical axis of the laser. Discharges that take place across these gaps generate ultraviolet radiation to condition this lasing space for a uniform discharge to take place. Typically, about twenty to forty such gaps will extend along the two sides of the main electrodes, depending on the size of the laser.

The metallic pins that form these pre-ionization gaps are subject to wear. If the wear becomes excessive on the pins of a particular gap, no discharge will take place at that gap and an asymmetry will arise, i.e. some gaps producing a discharge and some not, or the gaps not firing simultaneously. Any such asymmetry leads to a lack of reproducibility in laser performance, i.e. variations between the laser pulses in respect of their energy, timing or spatial location.

In an attempt to reduce this wear and thus increase the lifetime of the pre-ionization pins before they need to be replaced, various shapes of pins have been adopted. In particular it has been common to form one pin of each gap with an enlarged spherical end. However, these expedients have had only partial success, and have increased the cost of manufacture.

SUMMARY OF THE INVENTION

It has now been found that improved results can be achieved by fitting each pair of pins with a piece of insulating material (preferably ceramic material) extending between the pins to bridge the gap and provide a tracking surface for the pre-ionization discharge.

Trackers of this type have been used in the past in $CO_2$ lasers for avoiding non-firing of the pre-ionization gaps, but it had been expected that to use trackers in an excimer laser would be too detrimental to the operation of the laser to be tolerable. In contrast to $CO_2$ lasers, in which the degradation of the gas is extremely slow and can readily be taken care of by supplying fresh gas at a very slow rate, excimer lasers are highly sensitive to deterioration of the lasing gas mixture by pollutants formed from reaction of the halogen atoms in the gas mixture with the structural materials in the lasing vessel. For this reason, the materials used to form the vessel of an excimer laser and the parts therein (e.g. those needed to provide and support the electrodes, and to circulate the lasing gas around the vessel and between the electrodes) have been very carefully chosen to avoid or minimise the use of materials that would tend to form pollutants when exposed to the gas. For this reason, designers of excimer lasers have carefully avoided introducing any new material into the lasing vessel, and the trackers that have proved useful in $CO_2$ lasers have therefore not been adopted in excimer lasers.

It has now been discovered, however, that any potential disadvantage from the viewpoint of gas deterioration that the use of trackers in an excimer laser may bring with it, is more than overcome by an unexpected advantage. It has been found that, rather than producing the expected increase in gas pollution, trackers in an excimer laser actually produce significant improvements both in the gas lifetime, and in the performance of the laser generally.

A theory as to why these improvements have been observed is set out below in connection with a detailed description of preferred embodiments of the invention.

DETAILED DESCRIPTION OF THE PREFERRED EMBODIMENTS

Figure 1:
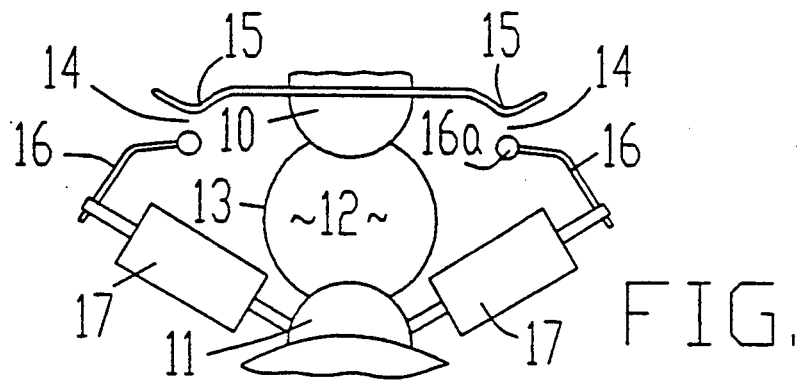
FIG. 1 is a fragmentary and diagrammatic end view of a conventional excimer laser showing the main electrodes and the pre-ionization pins.

FIG. 1 shows a fragment of a conventional excimer laser that has a pair of main electrodes 10 and 11 that define between them a lasing space 12 that extends along the optical axis of the laser between a pair of optics, one of which is shown at 13. Pre-ionization gaps 14 are defined between pins 15 connected to the main electrode 10 and pins 16 that are each connected through a peaking capacitor 17 to the main electrode 11. In a typical excimer laser there will be a series of about 20 such gaps 14 and peaking capacitors 17 extending along each side of the main electrodes 10, 11 and connected in parallel with each other.

Figure 2:
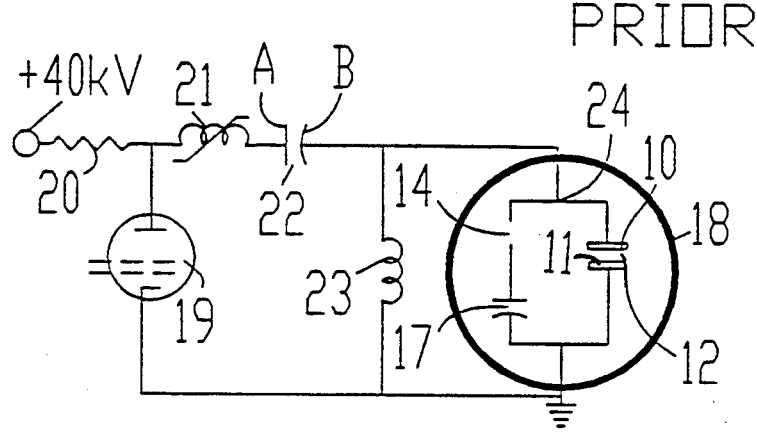
FIG. 2 is a circuit illustrating the manner in which this laser is pulsed.

FIG. 2 illustrates the manner in which the main electrodes 10, 11, the peaking capacitors 17 and the gaps 14 are connected inside the laser vessel 18. Prior to initiation of a laser pulse, a thyratron switch 19 is open, and a high D.C. voltage, say +40kV, is applied from a power supply (not shown) through a high voltage resistor 20 and a magnetic assist 21 to a first side A of a main capacitor 22, the second side B of which is connected through an inductor 23 to ground. To initiate a laser pulse, the switch 19 is closed, which action has the effect of grounding the first side A of the capacitor 22 and hence driving its second side B to approximately −40kV. This high negative voltage thus starts to appear at point 24 and is applied across the main electrodes 10, 11 and also across the pre-ionization gaps 14.

Figure 3:
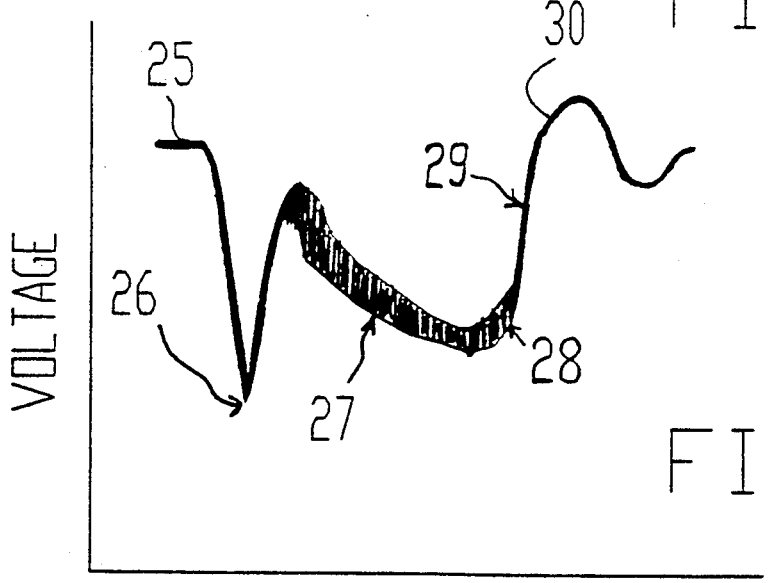
FIG. 3 is a diagram of the voltage across the main electrodes of this conventional laser.

This voltage is shown by curve portion 25 in FIG. 3. The pre-ionization gaps 14 break down first at 26, whereupon the peaking capacitors 17 charge up (curve portions 27). The ultraviolet radiation emitted by the discharges across the gaps 14 conditions the lasing gas in the space 12 so that, at approximately point 28, the main electrodes 10, 11 fire and utilize the energy now stored in the peaking capacitors 17 to produce a laser pulse. During this pulse the voltage across the main electrodes 10, 11 follows the path shown generally at 29. Oscilloscope photographs of this portion of the voltage trace show it to contain a large degree of radio frequency noise. This effect is believed to arise principally from the fact that during this time, especially during the curve portion 27, the voltage is oscillating in a manner known as ringing. This phenomenon is primarily due to stray capacitances in the laser, and possibly also due to a lack of truly simultaneous firing of the pre-ionization pins along the length of the electrodes 10, 11. After the stored energy has been expended in the laser pulse, the voltage recovers at 30 until the switch 19 is reopened to allow side B of the main capacitor to require its ground potential. The operation shown in FIG. 3 will typically last about 200 nanoseconds, the period between pulses, typically a few milliseconds, being used to recharge the main capacitor 22.

One of the electrode pins employed in each of the preionization gaps has typically been formed with a spherical end 16a, as shown in FIG. 1, in an attempt to minimise wear on the pins. Nevertheless the wearing of the pre-ionization pins has remained a problem in excimer lasers. For example, it has not been unusual for pre-ionization gaps originally set at 50 thousands of an inch to be found to have increased after $5 \times 10^8$ laser pulses to as much as 120 thousands of an inch as a result of wear, at which stage replacement may be necessary.

Figures 4A, 4B:
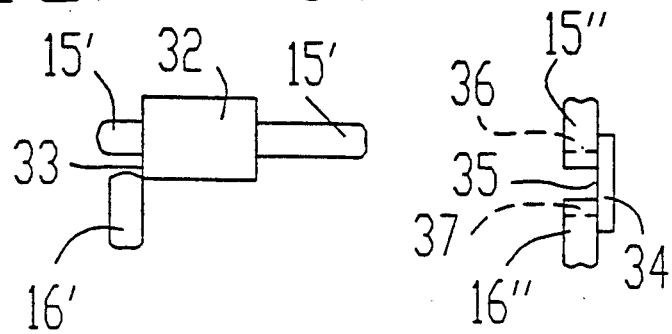
FIG. 4a is a side view of a modified construction of pre-ionization pins in accordance with a first embodiment of the invention.
FIG. 4b is a similar view according to a second embodiment of the invention.

In accordance with the present invention, the preionization pins, shown at 15' and 16' in FIG. 4a, are bridged by a cylindrical piece 32 of ceramic or other insulating material. While the material 32 is not an electrical conductor, its surface 33 that extends between the pins 15', 16' provides a surface along which a discharge can readily track from one pin to the other, for which reason this piece of ceramic or like insulating material is referred to as a tracker. The voltage needed to be applied across the pins to initiate a tracking discharge is much less than that required to initiate a discharge in the laser gas in the absence of a tracker.

FIG. 4b shows an alternative arrangement in which preionization pins 15'', 16'' face each other across a gap that is bridged by a similar tracker 34. An advantage of this construction is that the tracker 34 remains fully effective to provide a tracking surface 35 even if the pins should wear back to the lines 36, 37 or beyond, whereas, without the tracker, this wear would double the length of the gap in the gas.

While the preferred material for the trackers is a ceramic, other insulating materials can be used, provided that they are such as to erode so slowly that they have a long life and contribute as little as possible to the pollution of the laser gas.

Figure 5:
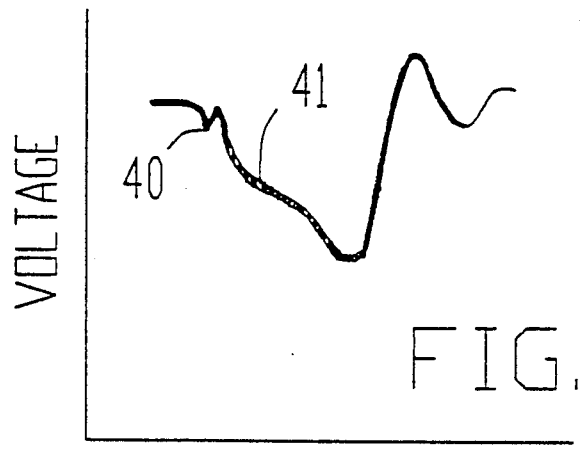
FIG. 5 is a diagram similar to FIG. 3, but showing the voltage during pulsing of a laser according to the invention.

FIG. 5 represents the appearance of an oscilloscope photograph that has been obtained from the same laser and operating circuit as were used in the experiment depicted in FIG. 3, but with all the pre-ionization gaps 14 fitted with trackers 32. It is seen that these gaps fired much sooner, i.e. at point 40. The criterion for the breakdown of a gap is not just voltage; it is the product of voltage and time. With the trackers in place, both the voltage level and the time needed to bring about the pre-ionization discharges were each reduced by about one order of magnitude, the product of these quantities thus being reduced by about two orders of magnitude. It is theorized that the much smaller and quicker excursion that the voltage has had to make to reach the point 40 is the principal cause of the significant reduction in the amount of radio frequency noise that was observed at 41 during the pulsing of the main electrodes, since the effect of the stray capacitances has been much reduced.

Figures 6, 7:
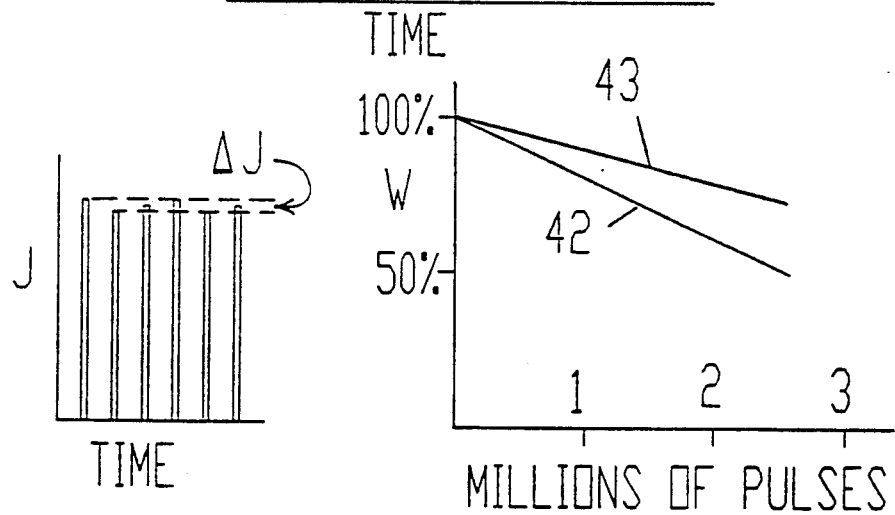
FIG. 6 is a pulse power diagram.
FIG. 7 is a gas lifetime diagram.

A reduction in radio frequency noise is desirable, as it results in less radio frequency interference emitted by the laser. The very reproducible firing of the pre-ionization gaps at point 40 results in improved pulse-to-pulse amplitude stability. FIG. 6 illustrates this latter point. The ordinate J represents the energy level in joules of the successive laser pulses shown, and it will be noted that there is a variation $\Delta J$ in the amplitude of these pulses. Measurements have shown that in an ArF laser with conventional pre-ionization gaps, i.e. without trackers, the value of $\Delta J$ for 90% of the pulses is typically about $\pm 12\%$, whereas in the same laser fitted with trackers, from which the diagram of FIG. 5 was obtained, this value was found to have fallen to about $\pm 5\%$.

While this improvement in pulse amplitude stability is advantageous in all excimer lasers, it is especially advantageous in ArF lasers, since these are more prone to amplitude instability than are KrF and XeC( lasers.

The most surprising and striking effect of the use of trackers, however, is illustrated in FIG. 7, which shows the output power W (in watts) plotted against the number of pulses. The conventional laser's performance is shown by curve 42, the output having fallen from 100% of rated power to 50% after about 2.5 million pulses, this fall off of performance being almost entirely due to deterioration of the laser gas. Curve 43 shows the results obtained with the same KrF laser fitted with trackers. The curve shows a reduction to only about 80% of rated power after 2.5 million pulses.

This significant performance improvement, which essentially reflects an improvement in gas lifetime, is the reverse of what had been expected. As explained above, conventional theory holds that, since the deterioration of the laser gas results mainly from its exposure to the materials that make up the interior of the laser, the introduction of yet another material, i.e. the ceramic trackers, would inevitably make matters worse. However, now that it has been discovered that the reverse is true, the theory has been developed that much of the degradation of the gas in a conventional excimer laser must have been a result of the preionization process. It is well known that the lasing gas becomes contaminated with a number of pollutants, including HF, $CF_4$, $SiF_4$ and $COF_2$, arising from reactions of the fluorine with the laser vessel interior. It now appears likely that these reactions were stimulated by the ultraviolet radiation. With the trackers in place, the pre-ionization discharges are assumed to be more benign in this respect, although it is clear that they remain fully effective in conditioning the main electrodes for firing.

Another potential advantage of ah excimer laser fitted with trackers is a reduction in spatial variation of the laser beam. In other words, it is expected that the output beam will remain steadier in position with less jitter in the two dimensions perpendicular to the beam axis, because of a generally improved stability of operation.

To summarise, the trackers have caused the initial conditions for which an excimer laser was designed in respect of pulse amplitude and possibly spatial stability to become more reproducible, while at the same time the radio frequency interference has been reduced, and the gas lifetime markedly increased. The lifetime of the pre-ionization pins themselves may also be increased, by virtue of their tolerance for wear, especially when the arrangement shown in FIG. 4b is used.

Finally, the presence of the trackers has positively avoided non-firing of one or more of the gaps. Because this difficulty has sometimes been experienced in the past, the shapes of the pins have the subject of special design considerations, e.g. use of a spherical tip. Since the certainty of firing provided by the trackers renders the shape of the pins far less important, they thus enable simpler and cheaper designs of pins to be used.

The invention also includes excimer lasers in which the peaking capacitor are mounted externally of the laser vessel.

We claim:

1. In an excimer laser having a pair of main electrodes defining a lasing space and a series of pairs of preionization pins forming pre-ionization gaps for generating discharges to condition the lasing space, the improvement comprising a tracker of insulating material located between each pair of pins to bridge the gap therebetween and provide a tracking surface for said discharges.

2. An excimer laser according to claim 1, wherein the material of the trackers is a ceramic or other long life insulating material highly resistant to erosion.

3. An excimer laser according to claim 1, wherein each tracker extends along each pair of pins away from the gap so as to continue to bridge the gap even when it has been widened by wearing away of the pins.

* * * * *